July 6, 1965 R. A. ADEE 3,193,023
DISC HARROW
Filed Sept. 30, 1963 4 Sheets-Sheet 1

INVENTOR.
Raymond A. Adee
BY
Hovey, Schmidt, Johnson & Hovey
ATTORNEYS.

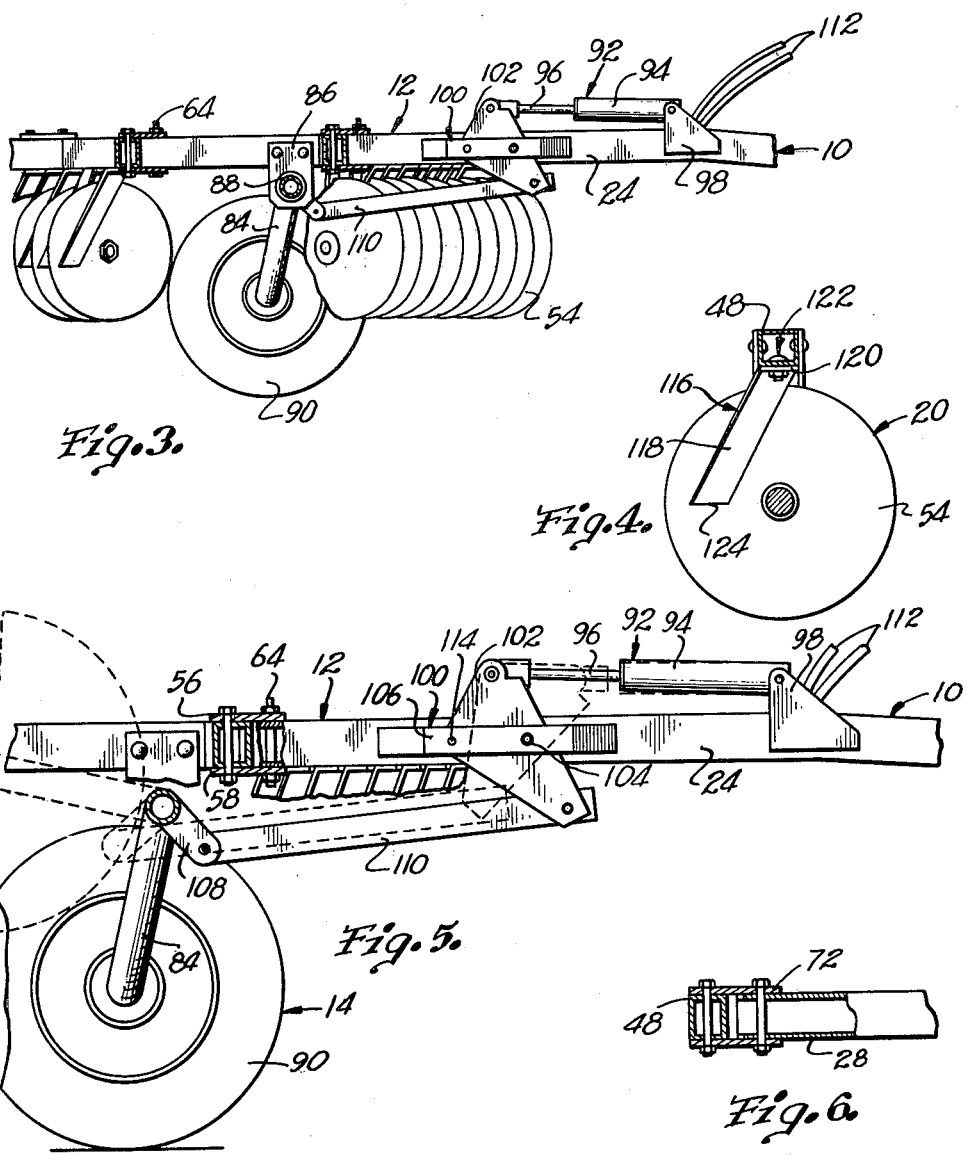

July 6, 1965

R. A. ADEE 3,193,023

DISC HARROW

Filed Sept. 30, 1963

INVENTOR.
Raymond A. Adee
BY
Hovey, Schmidt, Johnson & Hovey
ATTORNEYS

July 6, 1965
R. A. ADEE
3,193,023
DISC HARROW
Filed Sept. 30, 1963
4 Sheets-Sheet 4
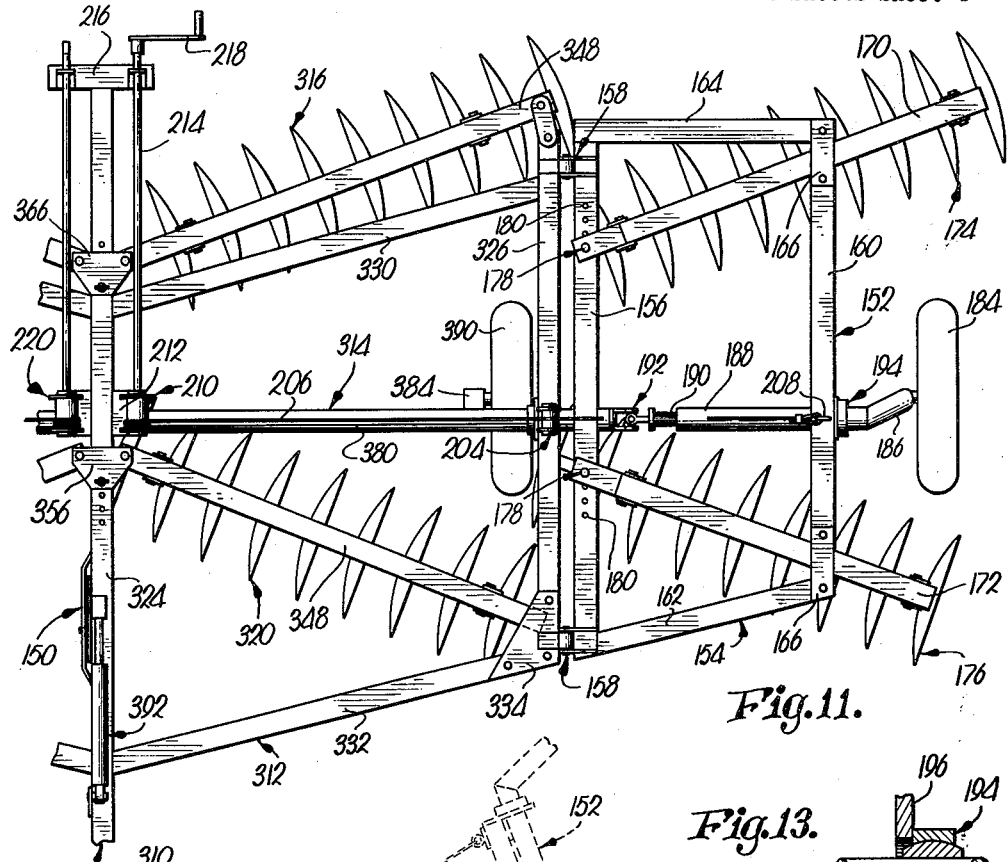
Fig.11.
Fig.13.
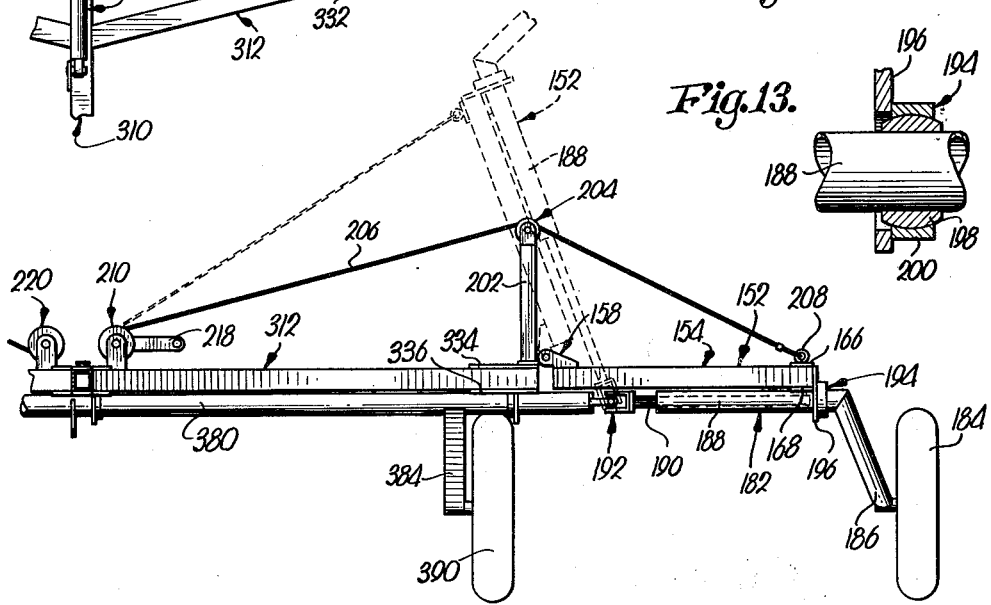
Fig.12.
INVENTOR.
Raymond A. Adee
BY
Hovey, Schmidt, Johnson & Hovey
ATTORNEYS.

United States Patent Office 3,193,023
Patented July 6, 1965

3,193,023
DISC HARROW
Raymond A. Adee, 400 Normandy Road, Newton, Kans.
Filed Sept. 30, 1963, Ser. No. 314,834
3 Claims. (Cl. 172—311)

This is a continuation-in-part of my co-pending application Serial No. 903, filed January 6, 1960, and entitled "Disc Harrow," now abandoned.

This invention relates to agricultural implements and, more particularly, to an improved disc harrow adapted to be towed behind a tractor or the like.

The primary object of the invention is to provide a disc harrow, the effective width of which may be selectively increased by the addition of novel wing units to present a substantially larger tillage implement for those applications where sufficient prime mover power is available.

Another very important object of the invention is to provide hinged wing units so that the width of the implement may be easily decreased to permit convenient transportation and storage of the implement when not in use without the necessity of complete removal of the wing extensions.

Still another very important object of the invention is to provide a relatively large tillage implement for working a wide strip of soil in a single operation of the implement, yet having sufficient flexibility to permit the disc gangs to conform to the contour of the soil even in comparatively rough terrain.

A further object of the instant invention is to provide wheeled support elements for each wing section which are operably coupled with the main frame support assembly to insure uniform tillage depth for the disc gangs on both the wing sections and the main frame.

An equally important object of the invention is to provide a flexible coupling between the supporting structure of the main frame and the wing extensions to permit swinging of the latter relative to the main frame without first uncoupling the supporting structure.

Still a further important object of this invention is to provide novel adjusting structure to facilitate manual adjustment of the angularity of the disc gangs with respect to the line of draft of the implement.

A still further important object of the invention is to provide a disc harrow having a wheel and axle assembly for supporting the discs out of engagement with the ground, and with the mechanism connected with the assembly for permitting raising of the disc gangs being provided with a lift shaft mounted underneath the frame whereby the harrow frame may be constructed of minimum front-to-back length and causing the disc gangs to follow the contour of the ground in the direction of travel of the tractor.

Other important objects and details of construction of the present disc harrow will become obvious or be explained in greater detail as the following specification progresses.

In the drawings:

FIG. 3 is a fragmentary, vertical, cross-sectional view taken substantially on line 3—3 of FIG. 1 and looking in the direction of the arrows;

FIG. 4 is an enlarged, vertical, cross-sectional view taken on irregular line 4—4 of FIG. 2;

FIG. 5 is a fragmentary, enlarged, vertical, cross-sectional view similar to FIG. 3 and more clearly illustrating the shifting movement of the wheel and axle assembly of the harrow shown in FIG. 1, as well as the mechanism for swinging the same;

FIG. 6 is an enlarged, fragmentary, vertical, cross-sectional view taken on irregular line 6—6 of FIG. 1;

FIG. 11 is a fragmentary, plan view of still another modified form of disc harrow showing one of the wing sections in the normal operating position;

FIG. 12 is a fragmentary, front elevational view of the harrow illustrated in FIG. 11 with the alternate position of the wing section appearing in dotted lines; and FIG. 13 is an enlarged, fragmentary, vertical cross-sectional view through the outer shaft bearing.

Figure 1:
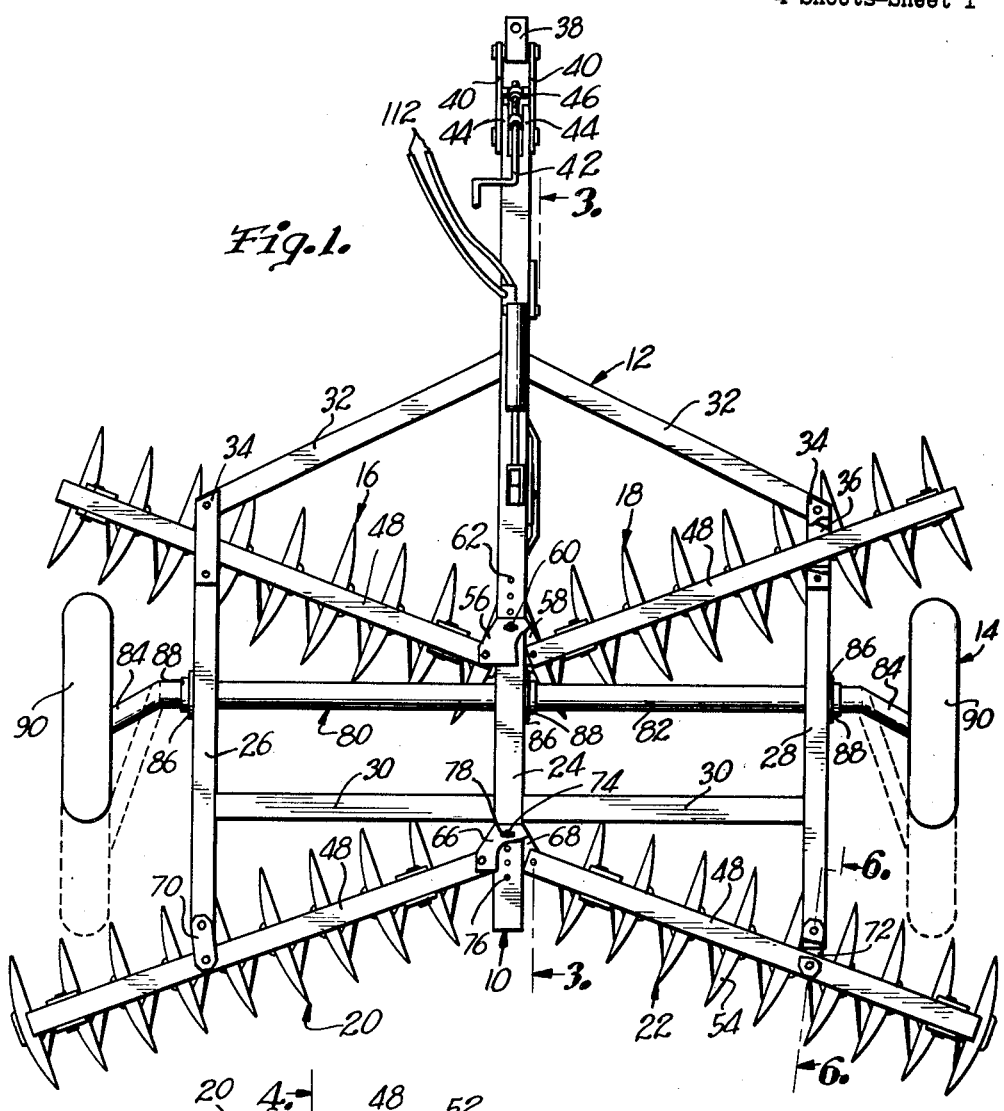
FIGURE 1 is a plan view of one form of a disc harrow embodying some of the principles of the present invention with certain parts thereof being broken away to reveal details of the components therebeneath and alternate positions of certain of the movable elements being shown in dotted lines.

A wheel-type tandem disc harrow broadly numerated 10 in the drawings and illustrated in its preferred form, includes a main frame 12 mounted on a wheel and axle assembly 14, carrying a series of disc gangs 16, 18, 20 and 22 arranged in tandem, and adapted to be towed behind a suitable power-operated vehicle such as a tractor.

Frame 12 comprises an elongated, centrally disposed, normally horizontal box member 24, as well as a pair of outboard box members 26 and 28 lying in a common plane with central member 24 and maintained in horizontally spaced, parallel relationship thereto by cross box members 30 interconnecting central member 24 with respective box members 26 and 28 in substantially perpendicular relationship thereto, as well as forwardly disposed, angularly positioned front box members 32 secured to central member 24 forwardly of cross members 30 and lying in the plane of members 24, 26 and 30. It is preferred that front members 32 be disposed at acute angles with respect to member 24 rearwardly from the front extremity of member 24 adapted to be coupled to the tractor and that the outer ends of members 32 remote from central member 24 terminate in spaced relationship to the proximal ends of outboard members 26 and 28.

As best shown in FIG. 1, elongated strips 34 and 36 are secured to and interconnect adjacent ends of front members 32 and corresponding outboard members 26 and 28. Strips 34 and 36 are parallel with respective members 26 and 28, in engagement with opposed upper and lower surfaces of front members 32 and box members 26 and 28, and define horizontal passages between the ends of front members 32 and outboard members 26 and 28.

Hitch 38 is swingably mounted on the forwardmost end of central member 24 by a pair of parallel links 40 swingably secured to hitch 38 and member 24 respectively for rotating movement on spaced, substantially horizontal axes. Crank arm 42, rotatably carried by brackets 44 and having one end thereof threaded into structure 46 spanning the distance between links 40, permits hitch 38 to be raised and lowered to correspond with the vertical height of the tractor hitch as crank arm 42 is rotated in opposite directions.

Figure 2:
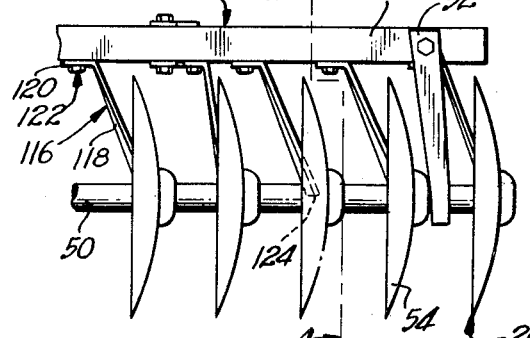
FIG. 2 is a fragmentary, enlarged, rear elevational view of the back gang disc at the left-hand side of the harrow, viewing FIG. 1.
Figure 7:
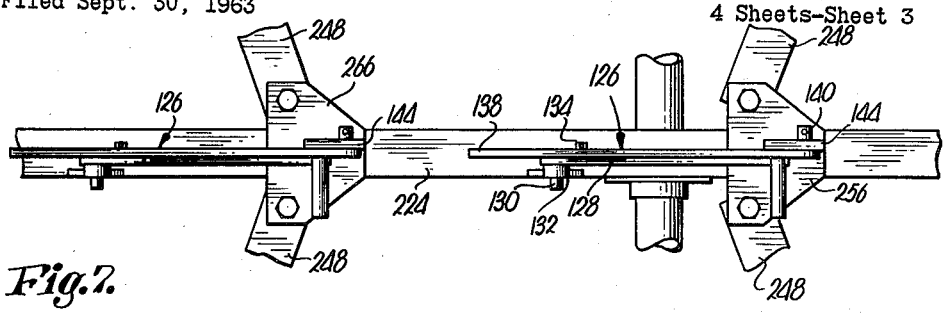
FIG. 7 is an enlarged, fragmentary, top plan view showing a modified mechanism for adjusting the angularity of the disc gangs.

Means for mounting disc gangs 16 to 22 inclusive on frame 12 includes a box beam 48 for each of the gangs and of substantially equal length. As indicated in FIG. 2, each of the disc gangs 16 to 22 inclusive, and with gang 20 shown in detail in the described figure, includes an elongated shaft 50 suspended from a respective beam 48 by a pair of bearings (not shown) carried by respective hangers 52 bolted to corresponding beams 48 at opposite ends thereof. By utilizing only two bearings for each of the shafts 50, prealignment of such bearings is obviated and manufacturing economies are effected by virtue of the elimination of expensive bearing alignment machinery.

Cup-shaped discs 54, secured to each of the shafts 50 for rotation therewith and disposed in longitudinally spaced relationship, are conventional in character and may have either smooth peripheral margins or serrated edges as desired.

Beams 48 of gangs 16 and 18 are pivotally joined at opposed, proximal ends thereof to a pair of vertically spaced and aligned, polygonal plates 56 and 58 positioned in abutting relationship to opposed upper and lower surfaces respectively of central member 24. Plates 56 and 58 are of sufficient width to cause the ends of beams 48 pivotally connected thereto to clear opposed side faces of central member 24 as plates 56 and 58, and thereby beams 48, are shifted longitudinally of member 24. It is to be noted that the ends of beams 48 joined to plates 56 and 58 are pivotal about parallel, horizontally spaced, vertically disposed axes.

Intermediate lengths of beams 48 of gangs 16 and 18 remote from plates 56 and 58 are slidably positioned within respective passages defined by strips 34 and 36 as well as proximal ends of front members 32 and outboard members 26 and 28 respectively. It is to be understood that the transverse height of each of the beams 48 of gangs 16 and 18 is substantially equal to the distance between proximal strips 34 and 36, whereby substantial vertical movement of each of the beams 48 is precluded, yet permitting longitudinal sliding movement of beams 48 relative to respective outboard members 26 and 28.

Aligned apertures 60 in plates 56 and 58 are adapted to be positioned in alignment with any one of a number of vertically disposed openings 62 through the upper and lower faces of central member 24, whereby a connector pin 64 may be passed through apertures 60 and aligned openings 62 to thereby maintain plates 56 and 58 in predetermined longitudinal relationship on central member 24.

Opposed, proximal ends of the beams 48 of gangs 20 and 22 are also pivotally joined to a pair of vertically spaced, parallel, aligned, polygonal plates 66 and 68 substantially identical with plates 56 and 58. The ends of beams 48 of gangs 20 and 22 are also spaced apart a distance sufficient to clear opposed side faces of central member 24 and are pivotal about horizontally spaced, parallel, vertical axes.

Means for securing intermediate portions of beams 48 of gangs 20 and 22 to outboard members 26 and 28 while permitting longitudinal shifting movement of the defined beams 48, preferably comprises a pair of vertically spaced and aligned, parallel links 70 and 72 pivotally joined to the rearmost ends of each of the outboard members 26 and 28 respectively, as well as to intermediate upper and lower surfaces of corresponding beams 48 of gangs 20 and 22.

Vertically aligned apertures 74 in plates 66 and 68 are also adapted to be disposed in alignment with a number of longitudinally spaced, vertically aligned openings 76 through opposed upper and lower surfaces of central member 24 adjacent the rearmost end thereof. Securing pin 78 extending through apertures 74 and a pair of aligned openings 76, maintains the beams 48 of gangs 20 and 22 in predetermined angular relationship relative to central member 24.

Wheel and axle assembly 14 preferably includes a one-piece, substantially U-shaped axle 80 having an elongated, relatively straight intermediate stretch 82 and laterally extending, short stretches 84 at opposed extremities thereof. Brackets 86 secured to each of the members 24, 26 and 28 in depending relationship thereto intermediate the ends of the same, carry horizontally aligned bearings 88 rotatably receiving intermediate stretch 82 of axle 80. Wheels 90, rotatably mounted on the outermost ends of short stretches 84, are disposed to engage the ground and thereby lift gangs 16 to 22 inclusive out of engagement with the ground surface upon swinging of stretches 84 about the longitudinal axis of intermediate stretch 82.

Means for swinging stretches 84 includes power-operated mechanism broadly numerated 92 adapted to rotate intermediate stretch 82 of axle 80 about the axis thereof. Mechanism 92 comprises a double-acting hydraulic cylinder 94 provided with a reciprocable piston rod 96 and mounted on the uppermost face of central member 24 forwardly of plates 56 and 58 by virtue of a pair of upright, horizontally spaced brackets 98, pivotally carrying the end of cylinder 94 remote from piston rod 96. A substantially U-shaped bracket 100 welded to one side face of central member 24 in proximity to the outer end of rod 96, pivotally mounts a triangular element 102 by virtue of a pivot pin 104 extending through the median stretch 106 of bracket 100, spaced from member 24 in parallelism therewith, thence through element 102 and carried by central member 24. The uppermost end of element 102, projecting above the upper surface of member 24, is pivotally joined to the outermost extremity of piston rod 96, while the lower end of element 102, extending downwardly below the lowermost face of member 24, is pivotally connected to a crank 108 rigidly secured to intermediate stretch 82 of axle 80, by an elongated link 110 extending below member 24 in substantial parallelism therewith. Hydraulic lines 112 coupled with cylinder 94 permit direction of hydraulic fluid to either end of the same from the hydraulic system of the tractor as desired, in order to reciprocate piston rod 96 in opposite directions.

Median stretch 106 of bracket 100 is preferably provided with an opening 114 therein in spaced relationship to pivot pin 104 and adapted to be aligned with one or more apertures (not shown) in element 102 to thereby permit a stop pin to be disposed within opening 114 and the aperture in element 102 aligned therewith to releasably prevent rotative movement of element 102 about the axis of pin 104.

Scraper blades broadly designated 116 are provided for each of the discs 54 and preferably comprise substantially L-shaped, one-piece elements having a relatively long leg 118 integral with a laterally extending, upper, substantially shorter leg 120. Scraper blades 116 are removably connected directly to corresponding beams 48 by bolt and nut means 122 passing through the lower horizontal section of each beam 48 and a respective upper leg 120 of blades 116. As best shown in FIGS. 2 and 4, legs 118 of scraper blades 116 are disposed at an angle with respect to legs 120 and beams 48 at a sufficient angle to cause the lower ends 124 to engage respective surfaces of disc 54 in scraping relationship thereto.

In operation, and assuming that harrow 10 is operably coupled to the hitch of a tractor or the like with wheels 90 supporting gangs 16 to 22 inclusive out of engagement with the ground, as indicated in FIG. 3, valve means on the tractor is actuated to cause hydraulic fluid to be directed into cylinder 94 via one of the lines 112, in a direction to shift rod 96 into cylinder 94 and thereby swing element 102 about the axis of pivot 104. As the upper end of element 102 moves toward cylinder 94, the lower end thereof swings toward axle 80 and causes crank 108 to be moved to the dotted line position shown in FIG. 5 by virtue of link 110 pivotally interconnecting crank 108 and the lower end of element 102. Rotation of intermediate stretch 82 of axle 80 about the axis thereof, causes stretches 84 to be swung rearwardly and lowering frame 12 until disc gangs 16 to 22 inclusive engage the ground and wheels 90 move out of engagement therewith. Harrow 10 is now in condition to be employed to disc the ground.

The relative angularity of gangs 16 to 22 inclusive with respect to the path of travel of harrow 10 may be changed as desired by the simple expedient of shifting plates 56 and 58, as well as plates 66 and 68, relative to central member 24, while wheels 90 are supporting gangs 16 to 22 inclusive out of engagement with the ground. Upon removal of pins 64 and 78, plates 56 and 58 as well as 66 and 68, may be shifted longitudinally of member 24 until respective apertures 60 and 74 are aligned with desired openings 62 and 76 in central member 24. It can be seen that as plates 56 and 58 are shifted longitudinally of member 24, the intermediate stretches of beams 48 of gangs 16 and 18 slide longitudinally in the passages defined by strips 34 and 36, as well as opposed ends of members 32 and outboard members 26 and 28 respectively. By the same token, longitudinal reciprocation of plates 66 and 68 on the rearmost end of central member 24, causes beams 48 of gangs 20 and 22 to shift longitudinally of outboard members 26 and 28, with links 70 and 72 compensating for longitudinal movement of the defined beams 48. Of particular note is the fact that gangs 16 and 18 as well as gangs 20 and 22 are simultaneously moved in response to shifting of plates 56 and 58 or 66 and 68 and, therefore, harrow 10 maintains its ability of track directly behind the tractor, notwithstanding variation of the angularity of gangs 16 to 22 inclusive on frame 12.

Disposing link 110 beneath central member 24 permits construction of frame 12 of minimum front-to-back length and thereby facilitates gangs 16 to 22 inclusive following the contour of the ground in the direction of travel of harrow 10.

Another important feature of the present harrow is the utilization of one-piece scraper blades 116 connected directly to respective beams 48 and thereby eliminating the necessity of providing an additional frame for carrying the scraper blades.

Referring now to FIGS. 7–10, mechanism for facilitating the adjustment of the angularity of the disc gangs is broadly designated by the numeral 126. Mechanism 126 includes a lever 128 having a laterally extending pin 130 journaled in a bracket 132 rigidly secured to the central member 224 of the disc harrow. Thus, lever 128 swings through a fore and aft arc about a substantially horizontal axis. A laterally extending lug 134 on lever 128 in spaced relationship from pin 130, is disposed for alignment with any of a plurality of spaced openings 136 in an elongated arm 138 which is pivotally coupled at one end thereof to the corresponding plate 256 or 266 by means of a laterally extending pin 140 on the end of arm 138.

Pin 140 is received within an aperture 142 in an upstanding bracket 144 rigidly secured to the upper surface of the respective plates 256 or 266. Aperture 142 is sufficiently greater in diameter than pin 140 in order to provide a relatively loose fit so that arm 138 may be shifted from the normal position thereof extending generally parallel with the axis of central member 224 to a position inclined at an angle from the latter and shown in dotted lines in FIG. 8. A hole (not shown) at the extreme outermost end of pin 140 is provided to receive therein a cotter key or the like 146, for releasably securing arm 138 to bracket 144.

It will be readily understood that mechanism 126 may be provided for each pair of disc gangs and the mechanisms 126 are utilized for altering the angularity of the gangs.

Figure 8:
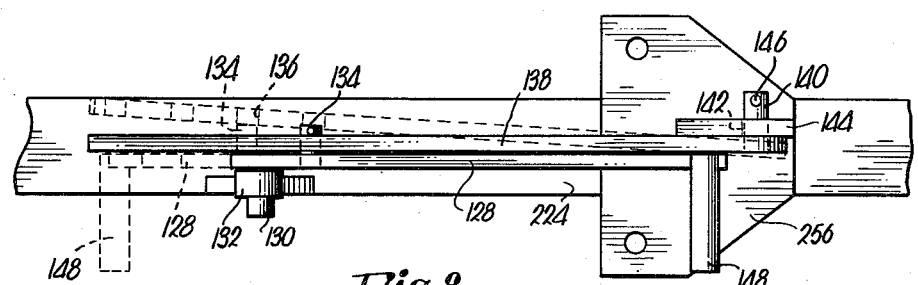
FIG. 8 is a fragmentary, plan view similar to FIG. 7 and on a still larger scale showing the mechanism of FIG. 7 with the deflected position of the arm and the initial position of the lever appearing in dotted lines.
Figure 10:
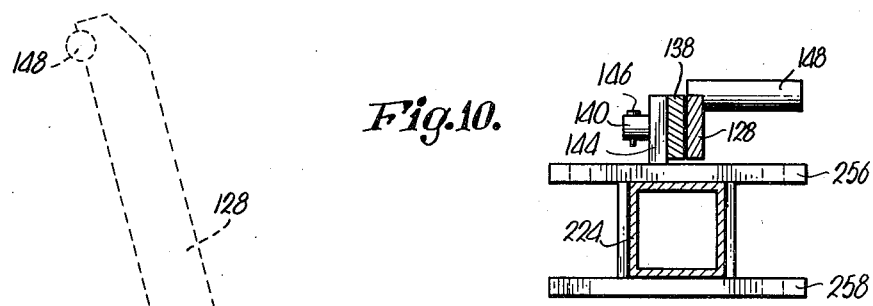
FIG. 10 is a detailed, vertical, cross-sectional view taken on line 10—10 of FIG. 9.
Figure 9:
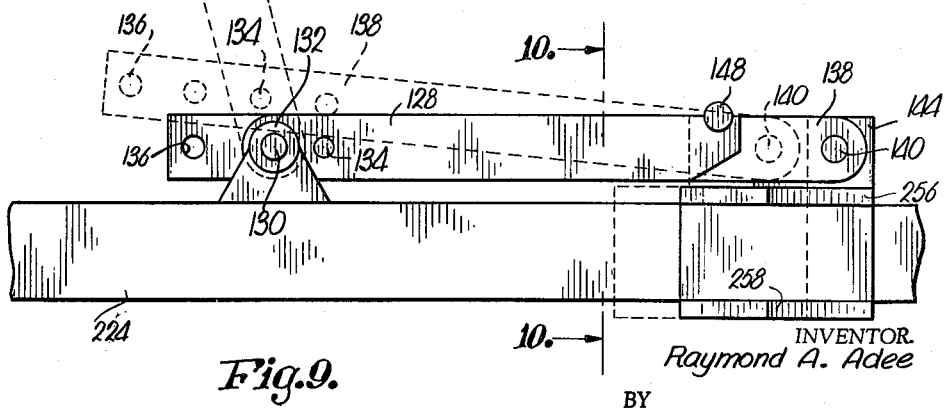
FIG. 9 is a fragmentary, enlarged, side elevational view of the mechanism illustrated in FIG. 7 shown in its locked position with the initial position of the lever and arm appearing in dotted lines.

In operation, the arm 138 is manually moved to the dotted line position thereof shown in FIG. 8 for disengaging lug 134 from its engaged position extending into an opening 136. Lever 128 is then pivoted about pin 130 to a position thereof which brings lug 134 into alignment with the next adjacent opening 136 in arm 138. Such a position is illustrated in dotted lines in FIG. 9. Arm 138 is then returned to its normal position with lug 134 now engaged within the next adjacent opening 136 whereupon the lever 128 is then manually rotated to its normal position lying in substantial alignment with central member 224. A laterally extending handle 148 on lever 128 is conveniently disposed to be grasped by the hand to facilitate manual operation of lever 128. The forward movement of lever 128 forces arm 138 forwardly to slide plate 256 along member 224. This, of course, changes the angularity of the disc gangs inasmuch as the beams 248 are pivotally coupled with the plates 256 or 266, respectively.

It will be readily understood that the reverse of the operation just described may be accomplished to effect the sliding of the plates 256 or 266 to the rear for altering the angularity of the disc gangs in the opposite direction. Sufficient openings 136 are provided in arm 138 to permit the step-by-step shifting of the plates 256 or 266 over a relatively long path of travel to selectively provide any desired angularity for the disc gangs which might be required for different soil operating conditions.

The lug 134 is located in closer proximity to the point of pivot of lever 128 about pin 130 than with handle 148 in order to provide multiple purchase or mechanical advantage so that the shifting of the disc gangs may be easily accomplished. If desired, aligned apertures (not shown) in lever 128 and arm 138 could be provided for locking mechanism 126 to preclude inadvertent swinging of lever 128 under the stresses imparted thereto by the disc gangs. Normally, the over-center position afforded by the slight elevation of the point of pivot for lever 128 by bracket 132, will be sufficient for locking mechanism 126 whereby the plates 256 and 266 are precluded from shifting until lever 128 is manually rotated to a position permitting the disengagement of arm 138 from lug 134.

A modified form of disc harrow is illustrated in FIGS. 11–13 and is broadly designated 310. Harrow 310 includes a main frame 312, a wheel and axle assembly 314, and disc gangs 316 and 320. The main frame 312 of harrow 310 is similar to the main frame 12 of harrow 10. Only one-half of harrow 310 has been illustrated for simplicity, but it will be understood that frame 312 includes a fore-and-aft central member 324 and a pair of outer members 326 spaced horizontally from and extending generally parallel with central member 324. Transverse members 330 and 332 have opposed ends thereof connected with members 324 and 326 to add rigidity to frame 312.

The wheels 390 of harrow 310 are located inboard with respect to member 326 and are journaled at one end of a leg 384 which is welded to the outer surface of the main axle 380, as shown best in FIG. 12. Power-actuated mechanism 392, which may be identical with mechanism 92, operates through mechanical linkage broadly 150, identical with the linkage for harrow 10 to rotate axle 380 in a manner to effect raising or lowering of frame 312.

Harrow 310 differs from harrow 10 in that a wing section 152 is provided at either side of frame 312 for extending the effective width of harrow 310. Section 152 includes a frame 154 comprising a longitudinal member 156 secured to member 326 by hinges 158. A second longitudinal member 160 is held in spaced relationship from member 156 by transverse members 162 and 164 having one end secured to member 156 and the other end thereof secured to plates 166 and 168 which are in turn secured to opposed ends of member 160.

Plate 166 interconnects the upper surfaces of the members 162 and 164 with the upper surface of member 160, while plates 168 interconnect the lower surface of the corresponding members to present slots between the members 162 and 164 and member 160 for receiving therein the beams 170 and 172 for disc gangs 174 and 176 carried by section 152. The other ends of the beams 170 and 172 are shiftably secured to member 156 by pin means 178 which cooperate with apertures 180 in member 156 for securing beams 170 and 172 at any desired position of angularity of the disc gangs 174 and 176 with respect to the line of draft of harrow 310.

Section 152 is supported in its normal operating position with frame 154 disposed generally horizontally by a wheel and axle assembly broadly numerated 182. Assembly 182 includes a wheel 184 secured to a downwardly extending stretch 186 of a tubular axle 188 extending in substantially axial alignment with axle 380 of the main frame 312. The inner surface of axle 188 is configured to complementally receive therein the irregular, outer surface of a shaft 190 which in turn is secured to one side of a universal joint broadly designated 192. The other side of joint 192 is rigidly secured to the outermost end of axle 380 whereby rotation of axle 380 by power means 392 and linkage 150, causes corresponding rotation of axle 188 of assembly 182. Axle 188 is rotatably secured to frame 154 by a bearing 194 housed within a bracket 196 secured to member 160.

Referring to FIG. 13, bearing 194 is illustrated as being of the self-aligning type wherein a bearing member 198 is movable with respect to the bearing housing 200 to permit pivotal movement of axle 188 with respect to frame 154.

An upright standard 202 is rigidly secured to the uppermost surface of member 326 and terminates at its uppermost end in a pulley assembly 204 having an elongated element 206 which may be a cable or the like entrained thereover. One end of element 206 is secured to member 160 by means of a ring 208 while the other end of element 206 is wrapped around a winch 210 secured to central member 324 by a bracket 212 and having an elongated operating shaft 214 extending rearwardly of harrow 310 and stabilized in a bracket 216 mounted on member 324. A crank 218 is provided for rotating shaft 214 to thereby wind the element 206 onto winch 210 for swinging the wing section 152 to the position thereof shown in dotted lines in FIG. 12. It will be understood that a wing section identical with section 152 is provided for the side of harrow 310, not shown in the drawings. A winch 220 is identical with winch 210, is provided for lifting the wing section (not shown) in the same manner as section 152 is lifted. Crank 218 is conveniently releasable from shaft 214 to be utilized with winch 220 as will be readily understood.

In operation, the wing sections on either side of harrow 310 are lowered to the substantially horizontal position thereof wherein the rotation of axle 380 for lowering frame 312, causes corresponding rotation of axle 188 and the lowering of frame 154. This disposes the gangs of discs 316, 320, 174 and 176 in contact with the ground for tilling the same as harrow 310 is moved by the prime mover. The hinges 158 permit the flexing of frame 154 with respect to frame 312 to accommodate the contour of the terrain which is traversed by the relatively wide harrow 310. Universal joint 192 permits this flexing while maintaining a uniform distance between the wheels 390 and 184 and their corresponding frames 312 and 154 so that the depth at which the disc gangs work the soil remains uniform despite relatively great variations in the contour of the ground.

When it is desired to transport harrow 310 over relatively narrow roads, through gates or the like, it is desirable to decrease the width of harrow 310. This is readily accomplished by the operation of winches 210 and 220 after the axles 380 and 188 have been rotated to disengage the gangs of discs from the ground.

Operation of winches 210 and 220 pulls the wing sections to the positions thereof shown illustrated in FIG. 12 with the outer surface of axle 188 resting in pulley 204. Shaft 190 is free to slide longitudinally in axle 188 to accommodate the swinging of section 152 to the substantially upright position thereof shown in FIG. 12. It should be pointed out that universal joint 192 is disposed in substantial alignment with the axis of axle 188 when the latter is in its elevated position. The disposition of universal joint 192 in this location permits the swinging of section 152 about hinges 158 which are vertically spaced from joint 192 without causing the bending or breaking of any of the components of section 152.

Top and bottom gusset plates 334 and 336 secured at the forward, outermost corners of main frame 312, provide slots therebetween which receive the outermost ends of beams 348 carrying the forward disc gangs of harrow 310. Thus, the plates 334 and 336 couple the front gangs with the frame for free swinging and reciprocable movement with respect to the frame 312 as the slide 356 is shifted along the central beam 324.

Manifestly, mechanism such as 126, described above, could be mounted on central member 324 for shifting slides 356 and 366 of harrow 310 in the manner explained with respect to plates 256 and 266. Additionally, if desired, similar mechanisms could be installed on member 156 for shifting the angularity of gangs 174 and 176 of the wing section 152.

Having thus described the invention, what is claimed as new and desired to be secured by Letters Patent is:

1. A disc harrow comprising:
   a wheel and axle assembly;
   a framework carried by said assembly, the framework including a central member and a pair of spaced side members;
   a pair of disc gangs carried in tandem relationship by the framework on each side of said central member, the gangs of each pair thereof diverging as the outer ends of the gangs are approached;
   a frame extension for each side of the harrow, each extension including a frame hingedly secured to a proximal side member for swinging movement through a substantially vertical arc outboard of the framework;
   a pair of disc banks carried in tandem relationship by each frame respectively, the banks of each pair thereof diverging as the outer ends thereof are approached, the spacing between the outer ends of said banks being at least as small as the spacing between the outer ends of the corresponding gangs.

2. Apparatus as set forth in claim 1, wherein is provided a second wheel and axle assembly rotatably secured to each frame for supporting the latter, the axle of said second assemblies being operably coupled to the axle of the first assembly for rotation therewith for maintaining the extension frames the same distance above the ground as said framework.

3. Apparatus as set forth in claim 2 wherein is provided a cable and winch assembly carried by the framework, said assembly including a cable secured to each of said frames for manual swinging of the frames to upright positions with respect to the framework.

References Cited by the Examiner
UNITED STATES PATENTS

| | | | |
|---|---|---|---|
| 2,787,105 | 4/57 | Witwer | 172—413 |
| 2,828,680 | 4/58 | Johnson | 172—456 X |
| 2,897,905 | 8/59 | McCleskey | 172—581 |
| 3,014,540 | 12/61 | Youngberg | 172—568 |
| 3,014,541 | 12/61 | Oehler et al. | 172—455 X |

T. GRAHAM CRAVER, *Primary Examiner.*

RUSSELL R. KINSEY, *Examiner.*